US009016741B1

(12) United States Patent
Thoreson et al.

(10) Patent No.: US 9,016,741 B1
(45) Date of Patent: Apr. 28, 2015

(54) SYSTEM FOR LIFTING, MOVING AND TRANSPORTING A VEHICLE VIA MULTIPLE SLINGS CONNECTED TO A COMMON LIFTING VERTEX, AND METHOD OF RETROFITTING A VEHICLE TO FACILITATE LIFTING

(71) Applicant: Hendrick Motorsports Performance Group, LLC, Charlotte, NC (US)

(72) Inventors: Mark Allen Thoreson, Concord, NC (US); Ryan Lee Hensley, Huntersville, NC (US)

(73) Assignee: Hendrick Motorsports Performance Group, LLC, Charlotte, NC (US)

(*) Notice: Subject to any disclaimer, the term of this patent is extended or adjusted under 35 U.S.C. 154(b) by 0 days.

(21) Appl. No.: 14/466,029

(22) Filed: Aug. 22, 2014

(51) Int. Cl.

| | |
|---|---|
| ***B66C 1/20*** | (2006.01) |
| ***B66C 1/14*** | (2006.01) |
| ***B62D 21/00*** | (2006.01) |
| ***B62D 65/00*** | (2006.01) |

(52) U.S. Cl.
CPC . *B66C 1/14* (2013.01); *B62D 21/00* (2013.01); *B62D 65/00* (2013.01); *Y10S 294/904* (2013.01); *B66C 1/20* (2013.01)

(58) Field of Classification Search
CPC .............. B66C 1/14; B66C 1/16; B66C 1/20; B62D 21/00; B62D 21/09; B62D 65/00; Y10S 294/904
USPC ............. 294/67.1, 67.4, 904; 296/203.01, 30; 280/762
See application file for complete search history.

(56) References Cited

U.S. PATENT DOCUMENTS

| | | | | |
|---|---|---|---|---|
| 1,270,571 A * | 6/1918 | Victel et al. | .................. | 294/82.1 |
| 1,440,570 A * | 1/1923 | West | ............................ | 294/67.1 |
| 1,498,150 A * | 6/1924 | Butler | ........................ | 294/67.33 |
| 1,941,582 A * | 1/1934 | Schroeder | .................... | 294/82.1 |
| 2,915,334 A | 12/1959 | Barenyi | | |
| 3,021,166 A | 2/1962 | Kempel et al. | | |
| 4,153,262 A | 5/1979 | Diamond et al. | | |
| 4,329,109 A | 5/1982 | Den Bleyker | | |

(Continued)

OTHER PUBLICATIONS

U.S. Department of Defense, “Design Criteria Standard Requirements for the Certification of Sling Loaded Military Equipment for External Transportation by Department of Defense Helicopters”, MIL-STD-913A, Feb. 3, 1997, pp. 1-11.

(Continued)

*Primary Examiner* — Dean Kramer
(74) *Attorney, Agent, or Firm* — Nelson Mullins Riley & Scarborough LLP

(57) ABSTRACT

A system for lifting a vehicle via multiple slings comprises a vehicle not engineered with structural facility to withstand lifting forces, including a frame which unmodified will deform in response to vertically imposed lifting forces, frame reinforcing elements affixed to the frame at selected locations which are subject to lifting deformation, at least two lifting members at spaced-apart forward frame locations, at least two lifting members at spaced-apart rearward frame locations, and a plurality of elongate slings extending respectively between each lifting member and a common lifting vertex. Each lifting member has an enlarged lower base portion rigidly affixed to the frame and an upper lifting portion. The frame reinforcing elements resist deformation of the frame in response to vertically imposed lifting forces. The enlarged base portions of the lifting members apply forces over a correspondingly enlarged area of the frame and the reinforcing elements without deforming the frame.

16 Claims, 4 Drawing Sheets

(56) References Cited

U.S. PATENT DOCUMENTS

| | | | | |
|---|---|---|---|---|
| 5,143,326 | A * | 9/1992 | Parks | 244/137.4 |
| 6,503,035 | B1 | 1/2003 | Perrott | |
| 6,695,566 | B2 | 2/2004 | Rodriguez Navio | |
| 7,192,049 | B2 | 3/2007 | Kuerten et al. | |
| 7,775,546 | B2 | 8/2010 | Asjad | |
| 8,061,747 | B2 | 11/2011 | Shoup et al. | |
| 8,371,602 | B1 | 2/2013 | Peschansky et al. | |
| 8,714,592 | B1 | 5/2014 | Thoreson et al. | |
| 2005/0126631 | A1 | 6/2005 | Gorman, Jr. | |
| 2006/0144598 | A1 | 7/2006 | Johnson | |
| 2009/0000849 | A1 | 1/2009 | Leonard et al. | |

OTHER PUBLICATIONS

U.S. Department of Defense, "Interface Standard for Lifting and Tiedown Provisions", MIL-STD-209K, Feb. 22, 2005, pp. 1-37, Appendix A, Appendix B, Appendix C and Appendix D.

U.S. Department of Defense, "Interface Standard for Transportability Criteria", MIL-STD-1366E, Oct. 31, 2006, pp. 1-118.

* cited by examiner

SYSTEM FOR LIFTING, MOVING AND TRANSPORTING A VEHICLE VIA MULTIPLE SLINGS CONNECTED TO A COMMON LIFTING VERTEX, AND METHOD OF RETROFITTING A VEHICLE TO FACILITATE LIFTING

FIELD OF THE INVENTION

The present invention relates generally to systems for lifting vehicles for movement or transport from one location to another. More particularly, the present invention relates to sling-type lifting systems for vehicle movement or transport via crane or aircraft, especially military vehicles being transported via military aircraft, typically transport helicopters.

BACKGROUND OF THE INVENTION

Military-specific automotive vehicles are often moved or transported from one location to another via a lifting system utilizing multiple elongate slings extending between a common lifting vertex and spaced apart connection points on the vehicle, e.g., for lifting vehicles by a crane to load and off-load vehicles from trucks, ships, railway cars, etc., or for more distant transport of a vehicle by a sling system suspended from a transport helicopter or other aircraft.

By contrast, however, most passenger and other commercially produced vehicles sold to the general public are not suitable for movement or transport via a sling lifting system. The frame components used in such vehicles are engineered in configurations designed to receive horizontally imposed forces as may occur in accidents with other horizontally moving vehicles, but otherwise the frame components in such commercially produced general purpose vehicles are typically relatively thin-walled and not suitable to withstand vertically applied forces on the order of forces as would occur during a sling lifting operation without deformation or damage to the vehicle frame.

Furthermore, as automotive safety technology applicable to passenger and other commercial vehicles has advanced in recent years, automotive engineers have learned that increased rigidity and strength of vehicle frame and body components does not necessarily promote or insure the safety of vehicle passengers and occupants, but to the contrary can be harmful to the extent that forces exerted on a vehicle in a crash or other accident can be transmitted unabated directly to occupants by a rigid vehicle structure. Accordingly, it has become commonplace for vehicle designs to include frame and body components designed to deform under forces generated in an accident, usually referred to as "crumple zones," intended to absorb such forces and thereby mitigate the forces imposed on vehicle occupants. However, such deformation or crumple zones exacerbate the inability of commercial vehicle frames to withstand vertical lifting forces exerted by sling lifting systems when moving and transporting vehicles as the forces exerted in lifting vehicles can be transmitted through the slings to cause deformation to the frame or body components in the regions of the crumple zones.

The sling lifting of military vehicles via military aircraft presents even greater concerns in avoiding potential frame damage to the vehicles. Hence, military specifications, e.g., U.S. Department of Defense Specifications MIL-STD-209, MIL-STD 913, and MIL-STD 1366, specify standardized requirements for sling lifting of military vehicles. Military vehicles are typically manufactured with reinforced structural frames that do not include crumple or deformation zones, and therefore are less subject to potential damage under the loading forces imposed during sling lifting operations. Various commercially produced general purpose vehicles could offer advantages if adapted for military use, but would almost certainly suffer frame or body damage or deformation under such sling loading forces.

Accordingly, a need exists for an improved system for sling lifting of vehicles providing greater resistance to loading forces to prevent damage to vehicle frame components, e.g., crumple zones in vehicle frames. In turn, such an improved lifting system could greatly expand the possibilities for military adaptation of vehicles not originally built for military purposes.

SUMMARY OF THE INVENTION

It is accordingly an object of the present invention to provide an improved system for lifting, moving and transporting vehicles that mitigates risk of damage to vehicle frame components and potentially expands the possibilities for vehicles to be adapted to military uses.

Briefly summarized, the present invention provides a system for lifting a vehicle via multiple slings. Basically, the lifting system of the present invention comprises in combination a vehicle not engineered with structural facility to withstand lifting forces such as would occur during sling lifting operations, in particular having a frame of a configuration which unmodified will deform in response to vertically imposed lifting forces applied to the frame, frame reinforcing elements affixed to the frame, a plurality of lifting members at selected spaced-apart locations about the frame, and a plurality of elongate slings extending respectively between each lifting member and a common lifting vertex.

According to the present invention, at least two lifting members are spaced laterally apart at forward locations on the frame and at least two lifting members are spaced laterally apart at rearward locations on the frame, with each lifting member having an enlarged lower base portion rigidly affixed to the frame and an upper lifting portion. The slings are respectively connected to the upper lifting portion of each lifting member. The frame reinforcing elements are affixed to the frame at selected locations on the frame which are subject to lifting deformation to resist deformation of the frame in response to vertically imposed lifting forces. The lifting members are arranged relative to one another to transmit lifting forces to the frame at selected locations thereon and the enlarged base portion of each of the lifting members is configured to apply forces over a correspondingly enlarged area of the frame without deforming the frame.

In a contemplated embodiment, the frame may include at least one deformation zone adapted to yield to absorb impact forces in the event of a crash of the vehicle, and at least one frame reinforcing element may be located at the deformation zone.

One or more of the lifting members may include a main body upstanding between the enlarged lower base portion and the upper lifting portion. The main body may be of a cross-section that enlarges from the upper lifting portion to the enlarged lower base portion, e.g., with a tapering cross-section. The upper lifting portion of one or more of the lifting members may comprise an eye portion for receiving a corresponding sling.

The enlarged lower base portion of one or more of the lifting members may be of a rectangular configuration or may be of a pyramidal configuration. The enlarged lower base portion of one or more of the lifting members may be affixed to an upwardly facing surface of the frame or may be affixed to a laterally facing surface of the frame.

The vehicle may include an operator location, with the lifting members at the forward frame locations being disposed forwardly of the operator location and the lifting members at the rearward frame locations being disposed rearwardly of the operator location.

The vehicle may also include a roll cage structure rigidly affixed to the frame, and one or more of the lifting members, e.g., the lifting members at the rearward frame locations, may comprise a part of the roll cage structure.

The vehicle frame may include a front bumper, and the lifting members at the forward frame locations may be disposed adjacent the front bumper.

According to another aspect of the invention, a method is provided for retrofitting a vehicle to facilitate lifting via multiple slings without damage to the vehicle. The method is adapted to a vehicle not engineered with structural facility to withstand lifting forces such as would occur during sling lifting operations, in particular a vehicle having a frame of a configuration which unmodified will deform in response to vertically imposed lifting forces applied to the frame. According to the method, frame reinforcing elements are affixed to the frame at selected locations. A plurality of lifting members are also affixed to the frame at selected spaced-apart locations about the frame, including at least two lifting members spaced laterally apart at forward locations on the frame and at least two lifting members spaced laterally apart at rearward locations on the frame, with each lifting member having an enlarged lower base portion rigidly affixed to the frame and an upper lifting portion. A plurality of elongate slings are attached to extend respectively between the upper lifting portion of each lifting member and a common lifting vertex. The locations of the frame reinforcing elements are selected to resist deformation of the frame in response to vertically imposed lifting forces. The locations of the lifting members are selected relative to one another on the frame to transmit lifting forces to the frame thereat via the enlarged base portion of each of the lifting members to apply lifting forces over a correspondingly enlarged area of the frame without deforming the frame.

In vehicles wherein the frame includes at least one deformation zone adapted to yield to absorb impact forces in the event of a crash of the vehicle, at least one of the frame reinforcing elements is located at the deformation zone.

DETAILED DESCRIPTION OF THE PREFERRED EMBODIMENTS

Figure 1:
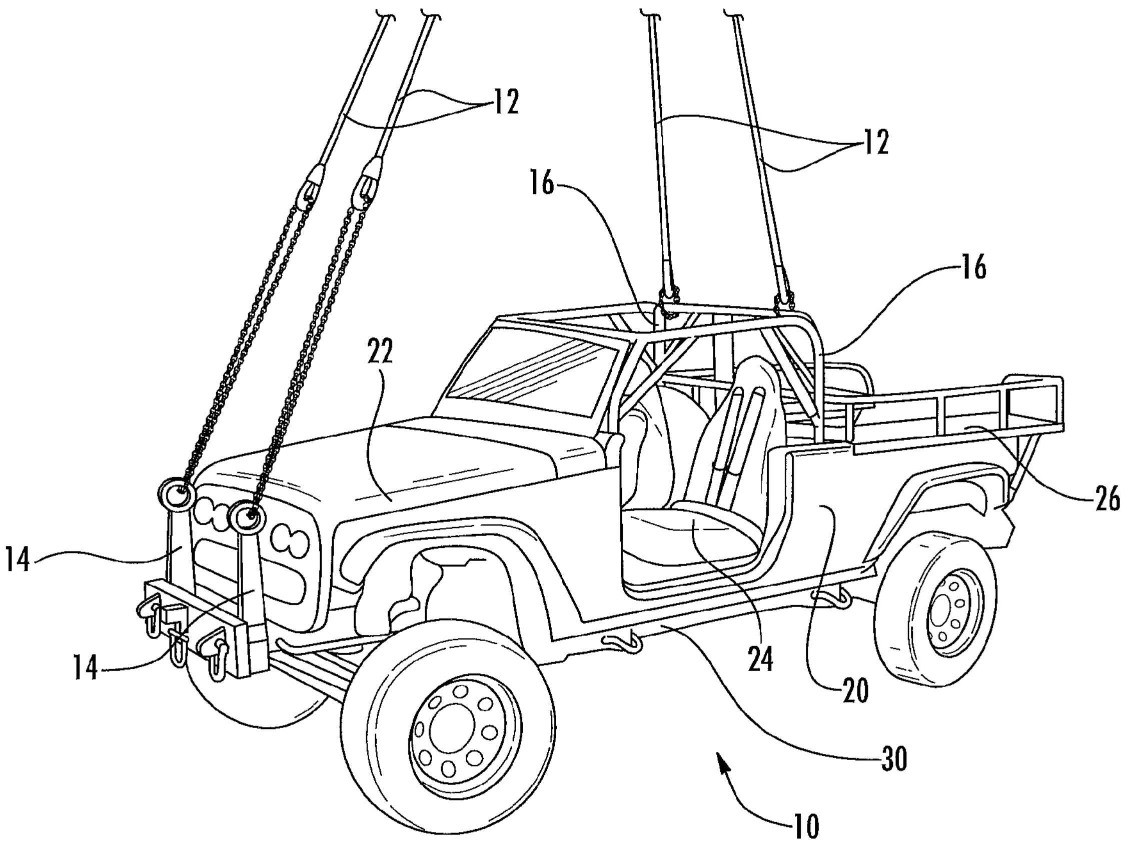
FIG. 1 is a front perspective view of a vehicle embodying lifting members for sling lifting in accordance with the system of the present invention.
Figure 2:
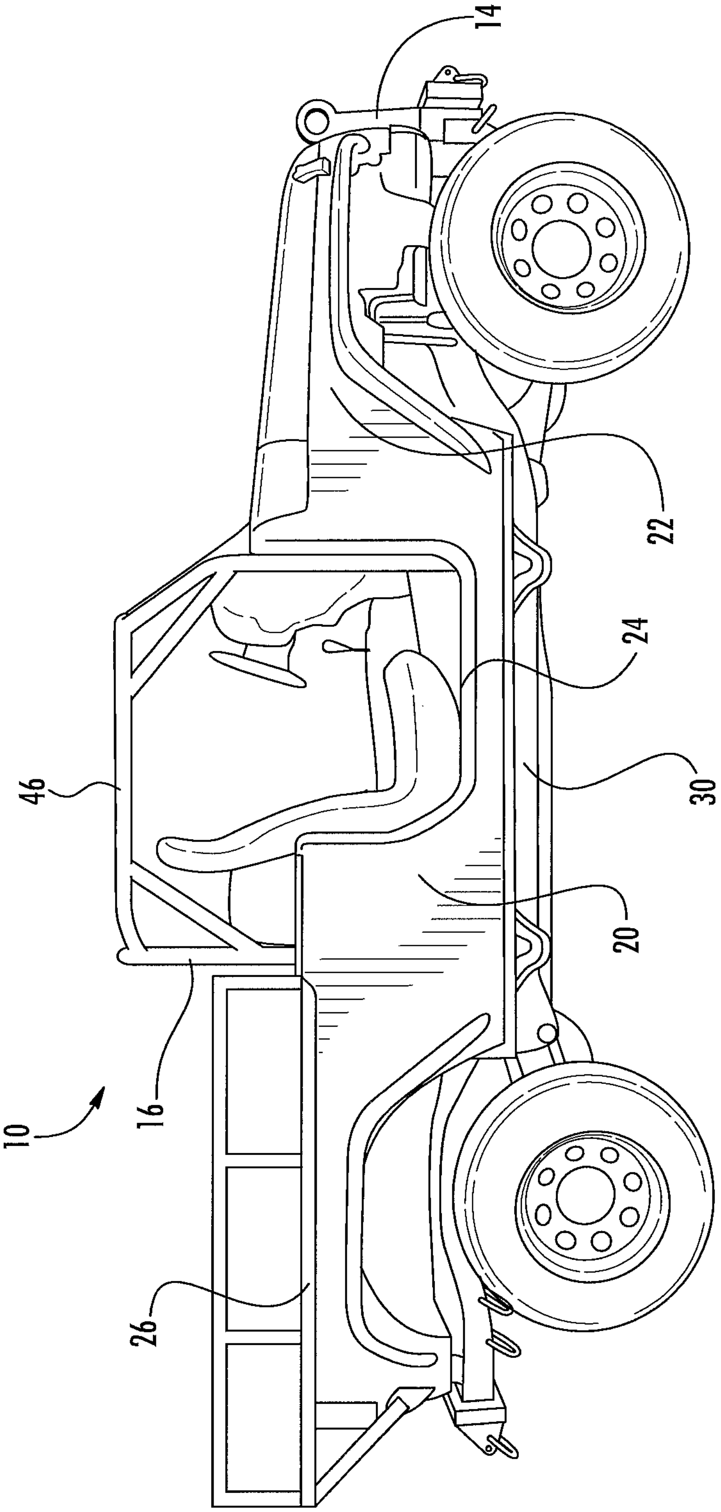
FIG. 2 is a right side elevational view of the vehicle of FIG. 1.

Referring now to the accompanying drawings, a system for retrofitting a vehicle for sling lifting in accordance with the present invention basically comprises a vehicle, indicated overall at 10 in FIGS. 1 and 2, equipped with a plurality of lifting members 14, 16 according to one possible embodiment of the present lifting system, in combination with an arrangement of multiple slings, e.g., slings 12, extending between the lifting members 14, 16 and a common lifting vertex 18 (FIG. 5), all as more fully described hereinafter.

With reference initially to FIGS. 1 and 2, the vehicle 10 is depicted as a utility vehicle of a type commercially-produced in compliance with applicable laws for operation on public roads and highways, as for example manufactured in differing forms by several existing automobile manufacturers, but which has attributes and features suitable for adaptation to military uses. However, it is to be understood that the depiction of the vehicle 10 in such form is solely for representative and illustrative purposes, and the present invention is not intended nor to be construed as limited to such vehicles. On the contrary, it is expressly contemplated that the lifting system of the present invention may be adapted for use in many and various other forms of vehicles.

Figure 5:
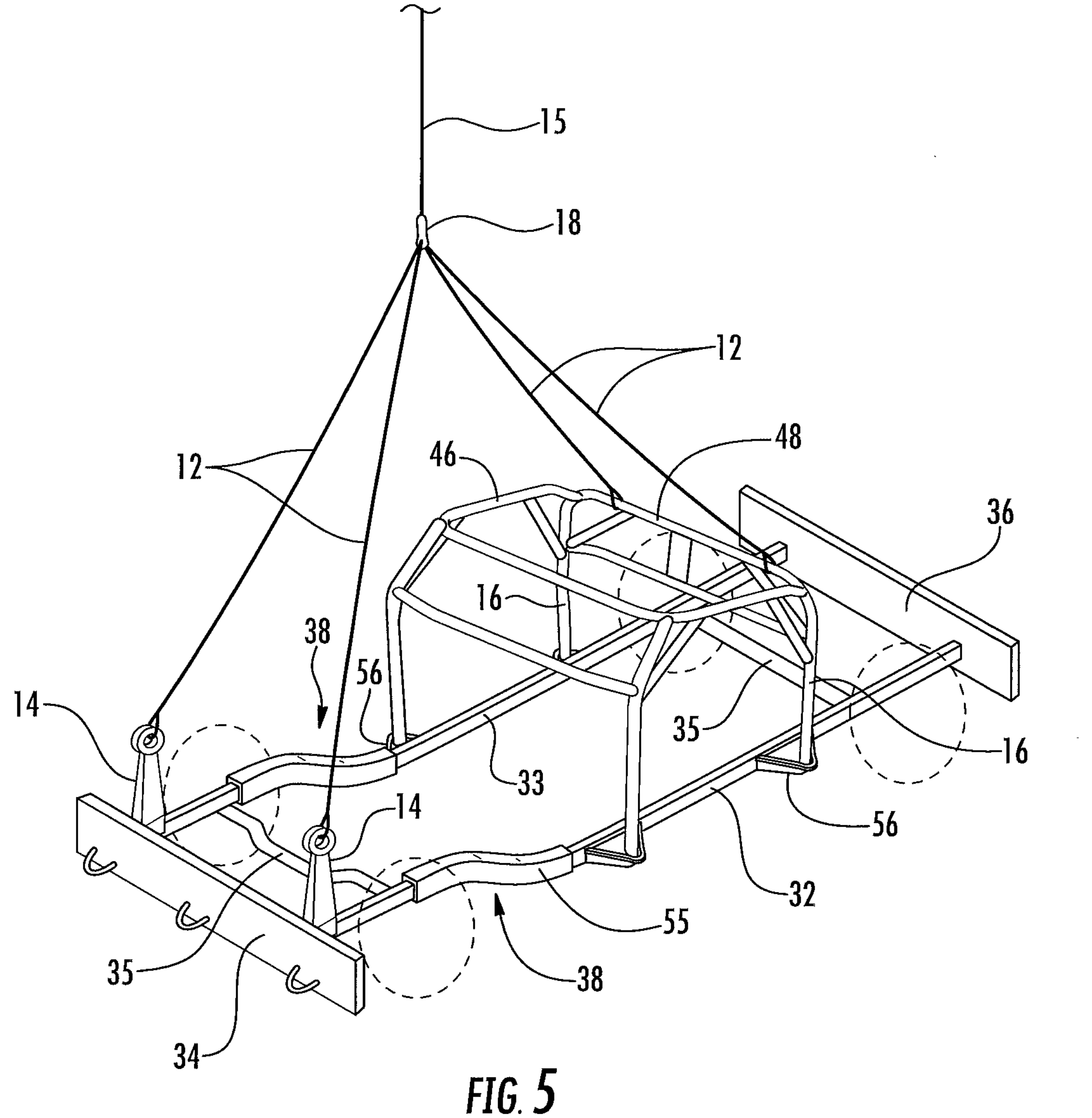
FIG. 5 is a schematic isometric view of the vehicle of FIGS. 1 and 2, showing the vehicle being lifted via slings in accordance with the system of the present invention.

In pertinent part, the vehicle 10 has a main structural frame 30 comprising two (and possible more) main frame rails 32, 33 extending in spaced-apart minor-image relationship lengthwise for substantially the full length of the vehicle 10 and connected in known manner integrally and rigidly with each other via a plurality of connecting frame members, e.g. frame cross-members 35 in FIG. 5, extending transversely between the frame rails 32, 33. The frame 30 further includes front and rear bumper portions 34, 36, respectively, in the form of structural members extending laterally between and secured rigidly to the respective front and rear ends of the frame rails 32, 33, e.g., by bolting and/or welding.

All of the operational components of the vehicle, such as, for example, drive train components (engine, transmission, differential, suspension components, etc., not shown) are mounted on the frame 30 and enclosed within a vehicle body, indicated overall at 20, also mounted on the frame 30. The vehicle body 20 may be of any suitable configuration, typically comprised of multiple integrated and connected body components, according to the intended use and function of the vehicle, such as, for example, an engine compartment 22, a driver or other operator compartment 24, which may also include accommodations for one or more passengers, and utility structures such as a cargo or storage structure 26.

The components of the frame 30, for example the frame rails 32, 33 and the cross members 35, are representatively depicted as being of a tubular rectangular cross-sectional configuration as commonly employed in many commercially produced vehicles, which is suitable to receive horizontally imposed forces such as occur in accidents with other vehicles, but which are neither reinforced nor otherwise suitable to withstand vertically applied forces, especially point loading vertical forces, as would occur during a sling lifting operation. In addition, according to well-known current safety practices for the manufacture of automotive vehicles operated on public roads, each of the frame rails 32, 33 may have one or more areas or zones designed to deform or otherwise yield in response to forces exerted on the frame 30 in excess of a predetermined threshold amount as would occur in the event of a crash with another vehicle or other type of accident, thereby to absorb at least a portion of such forces to prevent or mitigate the application of such forces to the operator/passenger compartment of the vehicle. Such areas or zones are commonly referred to as “crumple zones.” Such crumple zones may be formed by different manufacturing techniques, sometimes considered proprietary to manufacturers, and are not necessarily apparent from a visual inspection of a vehicle frame. Accordingly, the depiction of the frame rails 32, 33 in the accompanying drawings does not include a specific illustration of the crumple zones, but rather the zones are only representatively indicated at 38 in the schematic view of FIG. 5.

According to the invention, the lifting members 14, 16 basically comprise structural members rigidly affixed to the vehicle frame 30 in a selected number and at selected spaced-apart locations relative to the frame and to one another to provide lifting connections for the slings 12 by which the vehicle 10 may be lifted in a balanced disposition without deformation or other damage to the crumple zones 38 or otherwise to the frame 30. In the illustrated embodiment, the lifting members 14, 16 comprise upstanding structural stanchions, with two front stanchions 14 being affixed to the frame 30 at laterally spaced-apart forward locations on the respective frame rails 32, 33 and two rear stanchions 16 being similarly affixed to the frame 30 at laterally spaced-apart rearward locations on the respective frame rails 32, 33, thereby providing a total of four lifting locations at lateral and longitudinal spacings over the frame 30. The forward stanchions 14 in the illustrated embodiment are preferably affixed to the frame rails 32, 33 immediately behind the front bumper 34 and forwardly of the engine compartment 22, and the rearward stanchions 16 are preferably affixed to the frame rails 32, 33 immediately behind the operator compartment 24. However, as will be understood by persons skilled in the art, the lifting members 14, 16 are not restricted to stanchion-like structures nor to the specific locations as depicted and described, and other forms of structural lifting members as well as a greater number of lifting members at additional and/or different locations could be provided as necessary or desirable.

Each stanchion 14, 16 basically has a main upstanding body portion 40 extending between an enlarged lower base portion 42 rigidly affixed to a correspondingly enlarged area of a respective frame rail 32 or 33 and an upper lifting portion 44 configured and adapted for connection to a respective sling 12. In accordance with the invention, the enlarged base portion 42 of each stanchion 14, 16 serves to apply lifting forces to the respective frame rail 32 or 33 over a correspondingly enlarged area thereof, thereby to avoid point-loading of the frame 30 and to mitigate and prevent such forces from deforming or damaging the crumple zones 38 or other portions of the frame 30.

Figure 3:
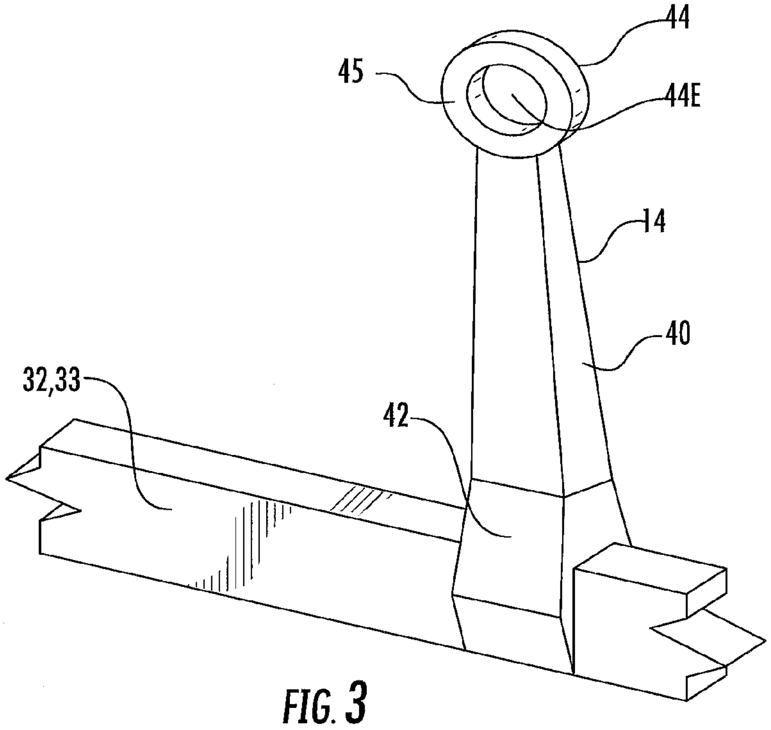
FIG. 3 is a fragmentary perspective view of the vehicle of FIGS. 1 and 2, showing the vehicle frame and one forward lifting member in enlarged perspective.

In the illustrated embodiment, as depicted in FIG. 3, each of the forward stanchions 14 comprise a circular ring 45 at the upper free end of the stanchion 14 forming a lifting portion 44 defining a circular eye portion 44E, and a main stanchion body 40 of a progressively tapering rectangular cross-section which gradually enlarges both laterally and longitudinally (i.e., in both horizontal X-Y directions) from the ring 45 downwardly to an enlarged tapering rectangular base portion 42 configured in the form of a rectangular saddle fitted over and rigidly welded to the upwardly facing top surface of the respective frame rails 32 or 33.

Figure 4:
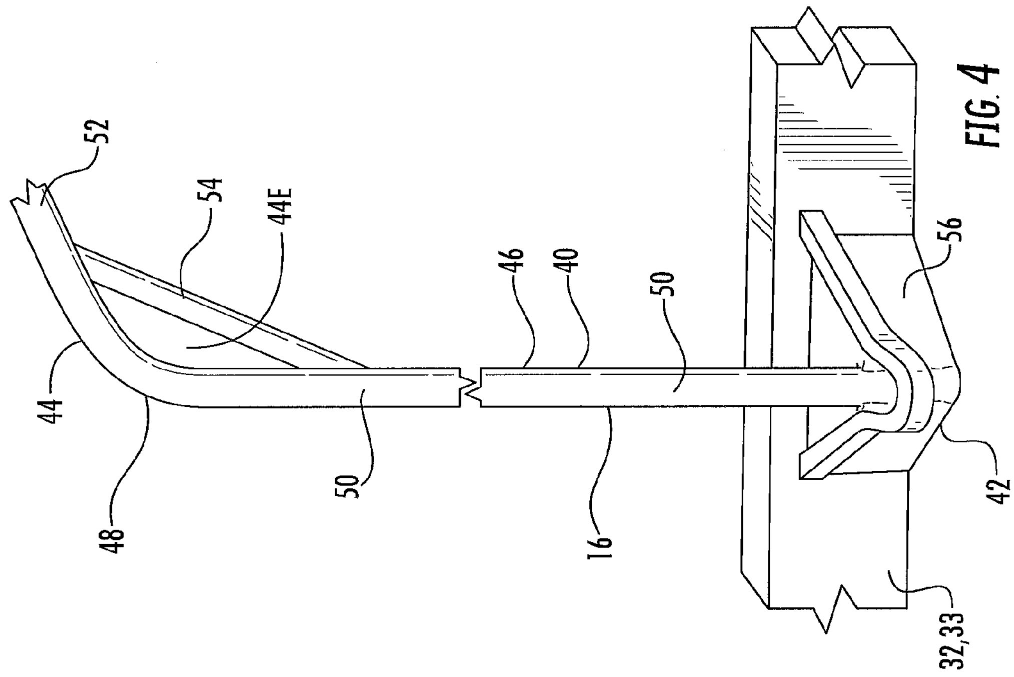
FIG. 4 is a fragmentary perspective view of the vehicle of FIGS. 1 and 2, showing the vehicle frame and one rearward lifting member in enlarged perspective.

Each of the rear stanchions 16 are formed as laterally spaced-apart upstanding portions of a roll cage structure 46 affixed to the vehicle frame 30. As will be understood, a utility vehicle such as the vehicle 10 will commonly and typically be equipped with a rigid roll cage structure, such as the roll cage 46, rigidly mounted on and affixed to the vehicle frame 30, which thereby conveniently facilitates use of the roll cage structure 46 for the additional function as the rear lifting stanchions 16 in the present invention. More specifically, the roll cage 46 comprises a network of rigid tubes of circular cross-section welded together into a cage-like configuration to surround and protect the operator compartment 24. The tube structure of the roll cage 46 includes an inverted U-shaped tube 48 disposed immediately rearwardly of the operator compartment 24 and having two vertically upstanding tube portions 50 respectively merging into an integral upper horizontal cross-tube portion 52. Angle brace portions 54 extend between each upstanding tube portion 50 and the cross-tube portion 52. As best depicted in FIG. 4, the lower end of each tube portion 50 is rigidly and integrally welded to a four-sided pyramidal structure 56 which, in turn, is rigidly welded to a laterally outward face of a respective one of the frame rails 32 or 33 at opposite sides of the frame 30. Thus, each upstanding tube portion 50 forms a main upstanding body portion 40 of a respective one of the rear stanchions 16, the area within the upper end of each upstanding tube portion 50, the cross-tube portion 52, and the adjacent angle brace portion 54 forms an upper lifting portion 44 defining an eye portion 44E of the respective rear stanchion 16, and the pyramidal structure 56 affixed at the lower end of the upstanding tube portion 50 forms an enlarged base portion 42 of the respective rear stanchion 16.

However, it is intended and to be expressly understood that various structural configurations of the stanchions 14, 16 together with various configurations of the enlarged lower base portions 42 and various mounting dispositions on the frame rails 32, 33 are contemplated to be possible to achieve the criteria of spreading lifting forces over enlarged areas of the frame rails 32, 33, so as to prevent deformation of and damage to the frame 30. For example, in vehicles which may not be equipped with a roll cage, a pair of lifting stanchions 16 will be affixed to the opposite frame rails 32, 33 at a selected rearward location on the vehicle frame 30, typically and preferably rearwardly of the operator compartment 24, and may comprise stanchions of the same or similar configuration as the stanchions 14 or stanchions of the configuration of stanchions 16, or stanchions or other lifting members of a different configuration, with an enlarged base portion 42 which may be of a tapered configuration as that of the stanchions 14 or of a pyramidal configuration as that of the stanchions 16 or a still further enlarged base configuration. Thus, it is to be understood that the lifting stanchions 14, 16 are only exemplary and representative lifting members, and the present invention is not limited to such specific structures.

According to another aspect of the invention, as the vehicle 10 is a commercially produced vehicle whose frame is not engineered with structural facility to withstand lifting forces such as occur during sling lifting in military operations, the vehicle frame 30 is reinforced at selected locations, e.g., at or adjacent to the location of the crumple zones 38 and/or at other locations on the frame 30 which may be subject to lifting deformation, in order to impart structural strength and rigidity to resist deformation of the frame 30 in response to vertically imposed lifting forces. For this purpose, reinforcing elements are affixed to the frame 30, e.g., by welding, at the selected locations. As the selection of the locations for reinforcing elements will differ from vehicle to vehicle according to a vehicle's specific frame configuration, reinforcing elements are depicted only representatively and schematically in FIG. 5 at 55 in the regions of the crumple zones 38, but it is to be understood that reinforcing elements may be provided at additional or other locations on the frame 30 subject to potential lifting deformation.

As previously indicated, the vehicle 10 is representatively depicted as being suitable for modification or adaptation for military uses. To facilitate military uses of the vehicle 10, it will be desirable if not essential that the vehicle be lifted via slings 12 for movement or transport from one location to another, e.g., via a crane or similar lifting apparatus for movement over short distances or via military helicopters or other aircraft for transport over longer distances. Suitable slings for such purposes may comprise chains, cables, straps, or any other elongate member of sufficient tensile strength and resistance to elongation forces to serve as a traction member for lifting. As depicted in FIGS. 1 and 5, each of four individual slings 12 is attached to a respective one of the stanchions 14, 16, e.g., via looping through the eye portion 44E of the upper lifting portion 44 or by a hook or similar implement engageable with the lifting portion 44, and in turn each of the four slings 12 is also connected to a common lifting vertex 18, which may be in the form of a cargo hook or similar connecting device at a depending end of a single common lifting sling 15 extending from a crane, aircraft or other lifting apparatus. Upon any such lifting of the vehicle, the opposing gravitational forces as well as additional forces imposed by other movements, laterally and/or vertically, of the lifting apparatus, are transmitted via the lifting stanchions 14, 16 to the frame rails 32, 33 of the vehicle. Owing to the selected locations and mounting arrangements of the lifting stanchions 14, 16 and the enlarged lower base portions 42 of the stanchions, the lifting forces are spread and applied over a correspondingly enlarged area of the frame rails 32, 33 which serves to mitigate any tendency for point loading of the frame 30 and, together with the selected provision of reinforcing elements 55 on the frame 30, to prevent the application of deforming forces to the crumple zones 38 and other portions of the frame 30. This lifting system is expected to satisfy the criteria of U.S. Department of Defense Specifications MIL-STD-209, MIL-STD 913, and MIL-STD 1366.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A system for lifting a vehicle via multiple slings without damage to the vehicle, comprising in combination:

a vehicle not engineered with structural facility to withstand lifting forces, the vehicle having a frame of a configuration which unmodified will deform in response to vertically imposed lifting forces applied to the frame, frame reinforcing elements affixed to the frame, a plurality of lifting members affixed to the frame at selected spaced-apart locations about the frame, including at least two lifting members spaced laterally apart at forward locations on the frame and at least two lifting members spaced laterally apart at rearward locations on the frame, each lifting member having an enlarged lower base portion rigidly affixed to the frame and an upper lifting portion, and a plurality of elongate slings extending respectively between the upper lifting portion of each lifting member and a common lifting vertex, the frame reinforcing elements being affixed to the frame at selected locations on the frame which are subject to lifting deformation to resist deformation of the frame in response to vertically imposed lifting forces, the lifting members being arranged relative to one another on the frame to transmit lifting forces to the frame at selected locations thereon and the enlarged base portion of each of the lifting members being configured to apply lifting forces over a correspondingly enlarged area of the frame without deforming the frame.

2. A system for lifting a vehicle via multiple slings according to claim 1, wherein the frame includes at least one deformation zone adapted to yield to absorb impact forces in the event of a crash of the vehicle, at least one of the frame reinforcing elements being located at the deformation zone.

3. A system for lifting a vehicle via multiple slings according to claim 1, wherein the upper lifting portion of one or more of the lifting members comprises an eye portion for receiving a corresponding sling.

4. A system for lifting a vehicle via multiple slings according to claim 1, wherein one or more of the lifting members includes a main body upstanding between the enlarged lower base portion and the upper lifting portion.

5. A system for lifting a vehicle via multiple slings according to claim 4, wherein the main body is of a cross-section that enlarges from the upper lifting portion to the enlarged lower base portion.

6. A system for lifting a vehicle via multiple slings according to claim 5, wherein the main body of said one or more of the lifting members has a tapering cross-section.

7. A system for lifting a vehicle via multiple slings according to claim 1, wherein the enlarged lower base portion of one or more of the lifting members is of a rectangular configuration.

8. A system for lifting a vehicle via multiple slings according to claim 1, wherein the enlarged lower base portion of one or more of the lifting members is of a pyramidal configuration.

9. A system for lifting a vehicle via multiple slings according to claim 1, wherein the enlarged lower base portion of one or more of the lifting members is affixed to an upwardly facing surface of the frame.

10. A system for lifting a vehicle via multiple slings according to claim 1, wherein the enlarged lower base portion of one or more of the lifting members is affixed to a laterally facing surface of the frame.

11. A system for lifting a vehicle via multiple slings according to claim 1, wherein the vehicle includes an operator location, the at least two lifting members at the forward frame locations being disposed forwardly of the operator location and the at least two lifting members at the rearward frame locations being disposed rearwardly of the operator location.

12. A system for lifting a vehicle via multiple slings according to claim 1, wherein the vehicle includes a roll cage structure rigidly affixed to the frame, and one or more of the lifting members comprise a part of the roll cage structure.

13. A system for lifting a vehicle via multiple slings according to claim 12, wherein the at least two lifting members at the rearward frame locations comprise parts of the roll cage structure.

14. A system for lifting a vehicle via multiple slings according to claim 1, wherein the frame includes a front bumper, the at least two lifting members at the forward frame locations being disposed adjacent the front bumper.

15. A method of retrofitting a vehicle to facilitate lifting via multiple slings without damage to the vehicle, comprising the steps of:

providing a vehicle not engineered with structural facility to withstand lifting forces, the vehicle having a frame of a configuration which unmodified will deform in response to vertically imposed lifting forces applied to the frame, affixing frame reinforcing elements to the frame at selected locations, affixing a plurality of lifting members to the frame at selected spaced-apart locations about the frame, including at least two lifting members spaced laterally apart at forward locations on the frame and at least two lifting members spaced laterally apart at rearward locations on the frame, each lifting member having an enlarged lower base portion rigidly affixed to the frame and an upper lifting portion, and attaching a plurality of elongate slings extending respectively between the upper lifting portion of each lifting member and a common lifting vertex, selecting the locations on the frame for affixing the frame reinforcing elements to resist deformation of the frame in response to vertically imposed lifting forces, selecting the locations of the lifting members relative to one another on the frame to transmit lifting forces to the frame thereat via the enlarged base portion of each of the lifting members to apply lifting forces over a correspondingly enlarged area of the frame without deforming the frame.

16. A method of retrofitting a vehicle to facilitate lifting via multiple slings according to claim 15, wherein the frame includes at least one deformation zone adapted to yield to absorb impact forces in the event of a crash of the vehicle, at least one of the frame reinforcing elements being located at the deformation zone.

* * * * *